(12) United States Patent
Morise et al.

(10) Patent No.: US 7,261,674 B2
(45) Date of Patent: Aug. 28, 2007

(54) HYDRAULIC CONTROL APPARATUS FOR AUTOMATIC TRANSMISSION

(75) Inventors: Masaru Morise, Nukata-gun (JP); Hideki Miyata, Okazaki (JP); Akio Sugawara, Toyota (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 254 days.

(21) Appl. No.: 11/081,748

(22) Filed: Mar. 17, 2005

(65) Prior Publication Data

US 2005/0215395 A1    Sep. 29, 2005

(30) Foreign Application Priority Data

Mar. 26, 2004    (JP) .............................. 2004-092421

(51) Int. Cl.
*F16H 61/06* (2006.01)

(52) U.S. Cl. .................. 477/117; 477/120; 477/158

(58) Field of Classification Search ................ 475/116, 475/117, 120, 121, 158
See application file for complete search history.

(56) References Cited

FOREIGN PATENT DOCUMENTS

JP        A 07-019326        1/1995

*Primary Examiner*—Ha D. Ho
(74) *Attorney, Agent, or Firm*—Kenyon & Kenyon LLP

(57) ABSTRACT

A hydraulic control apparatus for an automatic transmission provided with a friction engaging element that operates using hydraulic pressure includes a range pressure oil passage which is connected to the friction engaging element; a manual valve which is connected to the range pressure oil passage; a drain port which is formed in the manual valve and which drains hydraulic pressure of the range pressure oil passage; a drain oil passage which is connected to the drain port; and a drain pressure controller which is connected to the drain oil passage and which performs control so as to change a decreasing rate of drain pressure of the drain oil passage.

9 Claims, 6 Drawing Sheets

FIG.3

|      | C1 | C2 | B1 | B2 | B3 | F |
|------|----|----|----|----|----|----|
| 1ST  | ○  | ×  | ×  | ◎  | ×  | △ |
| 2ND  | ○  | ×  | ○  | ×  | ×  | × |
| 3RD  | ○  | ×  | ×  | ×  | ○  | × |
| 4TH  | ○  | ○  | ×  | ×  | ×  | × |
| 5TH  | ×  | ○  | ×  | ×  | ○  | × |
| 6TH  | ×  | ○  | ○  | ×  | ×  | × |
| R    | ×  | ×  | ×  | ○  | ○  | × |
| N    | ×  | ×  | ×  | ×  | ×  | × |

◎ ENGAGED/APPLIED WHEN ENGINE BRAKE IS APPLIED
△ ENGAGED/APPLIED ONLY WHEN ENGINE DRIVES

HYDRAULIC CONTROL APPARATUS FOR AUTOMATIC TRANSMISSION

INCORPORATION BY REFERENCE

The disclosure of Japanese Patent Application No. 2004-092421 filed on Mar. 26, 2004 including the specification, drawings and abstract is incorporated herein by reference in its entirety.

BACKGROUND OF THE INVENTION

1. Field of the Invention

The invention relates to a hydraulic control apparatus for an automatic transmission. More particularly, the invention relates to a hydraulic control apparatus for an automatic transmission, which controls hydraulic pressure drained from a friction engaging element.

2. Description of the Related Art

A technology for reducing select shock which occurs during a select operation for changing a position from the D position to the N position has been proposed.

A hydraulic control apparatus for an automatic transmission, which gradually decreases hydraulic pressure supplied to a friction engaging element and reduces select shock is disclosed in FIG. 4 in Japanese Patent Application Publication No. JP-A-07-019326. The hydraulic control apparatus for an automatic transmission disclosed in Japanese Patent Application Publication No. JP-A-07-019326 includes a manual valve which introduces line pressure from a line pressure oil passage to a D range pressure oil passage by a select operation for changing a position to the D position, and which drains the pressure supplied to the D range pressure oil passage through a D range pressure drain oil passage by a select operation for changing the position from the D position to the N position; an electronic hydraulic control valve which adjusts D range pressure from the D range pressure oil passage according to a control command from the outside and then introduces the adjusted pressure to a control pressure oil passage to the friction engaging element; and an orifice which is formed in the D range pressure drain oil passage.

With the hydraulic control apparatus for an automatic transmission disclosed in Japanese Patent Application Publication No. JP-A-07-019326, during the select operation for changing the position from the D position to the N position, the D range pressure can be gradually decreased and the select shock can be reduced by controlling an amount of drained D range pressure using the orifice.

However, in the hydraulic control apparatus disclosed in Japanese Patent Application Publication No. JP-A-07-019326, since the amount of drained D range pressure is controlled by the orifice, a problem is caused. For example, when an oil temperature is low, there is a possibility that the D range pressure is not drained completely, the friction engaging element has a low torque capacity, and the friction engaging element is not disengaged even if a shift lever is at the N position. Also, for example, during the select operation for changing the position from the D position to the R position or from the R position to the D position (i.e, during the garage shift), the friction engaging element needs to be disengaged promptly in order to prevent tie-up (i.e., double lock-up). However, there is a problem that the friction engaging element cannot be disengaged promptly since the amount of drained D range pressure is controlled by the orifice.

SUMMARY OF THE INVENTION

The invention is made in light of the above-mentioned circumstances. It is an object of the invention to provide a hydraulic control apparatus for an automatic transmission, which can achieve both reduction of select shock and prompt disengagement of a friction engaging element.

Accordingly, there is provided a hydraulic control apparatus for an automatic transmission provided with a friction engaging element that operates using hydraulic pressure. The hydraulic control apparatus includes a range pressure oil passage which is connected to the friction engaging element; a manual valve which is connected to the range pressure oil passage; a drain port which is formed in the manual valve and which drains hydraulic pressure of the range pressure oil passage; a drain oil passage which is connected to the drain port; and a drain pressure controller which is connected to the drain oil passage and which performs control so as to change a decreasing rate of drain pressure of the drain oil passage.

With the above-mentioned hydraulic control apparatus for an automatic transmission, the range pressure oil passage is connected to the friction engaging element, and the manual valve is connected to the range pressure oil passage. The drain port for draining hydraulic pressure from the range pressure oil passage is formed in the manual valve, and the drain oil passage is connected to the drain port. The drain pressure controller connected to the drain oil passage performs control so as to change the decreasing rate of the drain pressure of the drain oil passage. Therefore, for example, when the select operation for changing the position from the D position to the N position is performed or when the select operation for changing the position from the R range to the N range is performed, the decreasing rate of the drain pressure is made low and one of the D range pressure and the R range pressure is decreased gradually, whereby the friction engaging element can be disengaged gradually. As a result, the select shock can be suppressed. For example, in the case where an oil temperature is low, when the select operation for changing the position to the N position is performed, the decreasing rate of the drain pressure is made high, one of the D range pressure and the R range pressure is decreased promptly, whereby the friction engaging element can be disengaged promptly. When the select operation for changing the position from the D position to the R position is performed or when the select operation for changing the position from the R position to the D position is performed (i.e., the garage shift is performed), the decreasing rate of the drain pressure is made high, the D range pressure and the R range pressure are decreased promptly, whereby the friction engaging element can be disengaged promptly. Accordingly, it is possible to provide the hydraulic control apparatus for an automatic transmission, which can achieve both reduction of the select shock and prompt disengagement of the friction engaging element.

BRIEF DESCRIPTION OF THE DRAWINGS

The above-mentioned and other, features, advantages, technical and industrial significance of this invention will be better understood by reading the following detailed description of exemplary embodiments of the invention, when considered in connection with the accompanying drawings in which:

FIG. 3 is an operation chart showing a relationship between shift speeds and operation states of brakes and clutches;

DETAILED DESCRIPTION OF THE PREFERRED EMBODIMENTS

Figure 1:
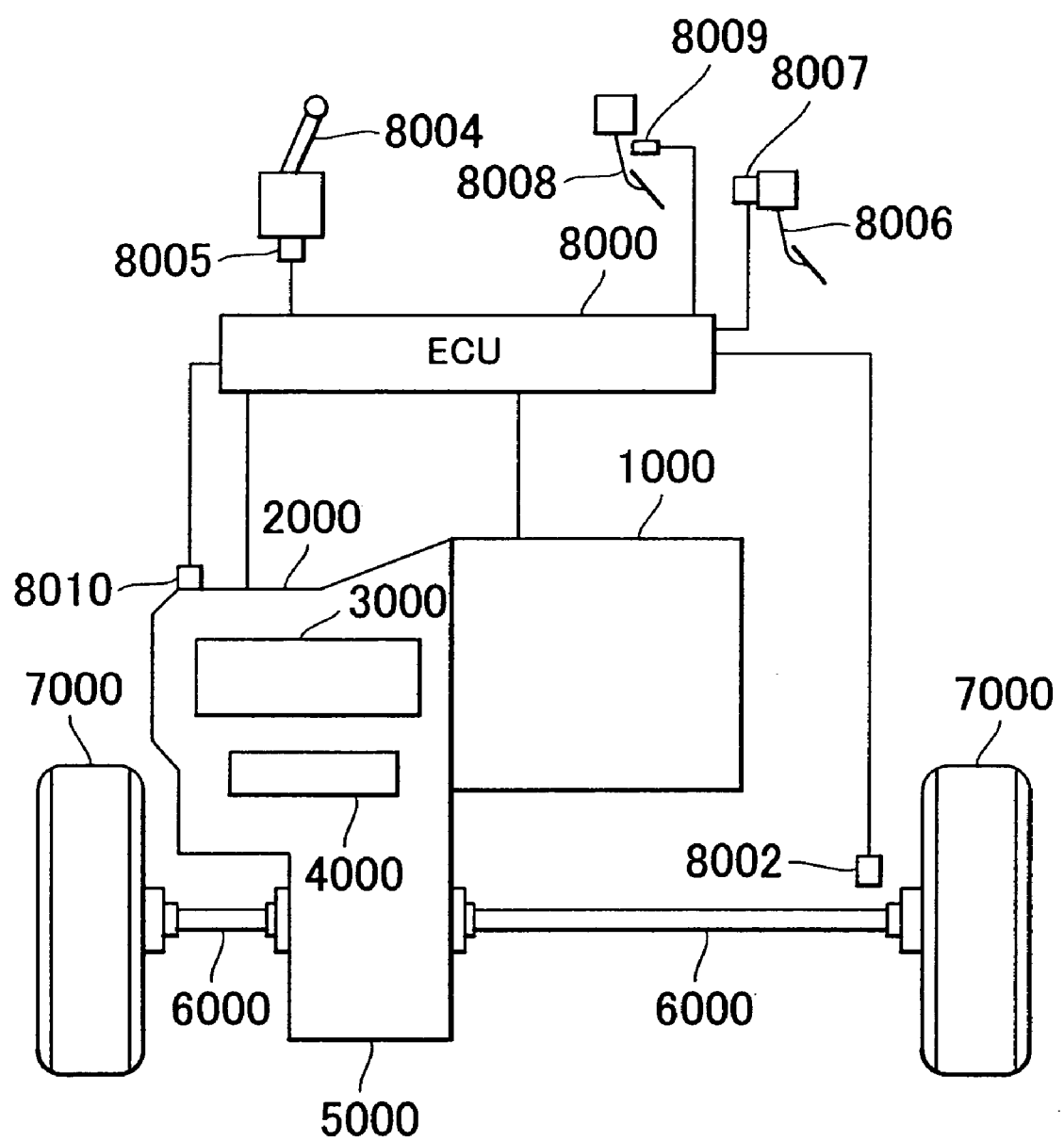
FIG. 1 is a block diagram showing a vehicle provided with a hydraulic control apparatus according to a first embodiment of the invention.

In the following description and the accompanying drawings, the present invention will be described in more detail with reference to exemplary embodiment. In the following description, the same reference numerals will be assigned to the same components, the names and functions are also the same. Therefore, detailed description concerning the components having the same reference numerals will be made only once.

A vehicle provided with a hydraulic control apparatus for an automatic transmission according to a first embodiment of the invention will be described with reference to FIG. 1. The vehicle is a FF (Front engine Front drive) vehicle. Note that a vehicle provided with the control apparatus for an automatic transmission according to the embodiment may be a vehicle other than a FF vehicle.

The vehicle includes an engine 1000; a transmission 2000; a planetary gear unit 3000 which constitutes a part of the transmission 2000; a hydraulic circuit 4000 which constitutes a part of the transmission 2000; a differential gear 5000; drive shafts 6000; front wheels 7000; and an ECU (Electronic Control Unit) 8000.

The engine 1000 is an internal combustion engine which burns a mixture of fuel injected from an injector (not shown) and air in a combustion chamber of each of cylinders. A piston in the cylinder is pushed down due to combustion, and a crankshaft is rotated. Note that an external combustion engine may be used instead of an internal combustion engine. Also, a rotary electric machine or the like may be used instead of the engine 1000.

The transmission 2000 changes a rotational speed of the crankshaft to a desired value by achieving a desired shift speed. An output gear of the transmission 2000 is meshed with the differential gear 5000. The planetary gear unit 3000 and the hydraulic circuit 4000 will be described later in detail.

The drive shaft 6000 is coupled with the differential gear 5000 by spline coupling or the like. Power is transmitted to right and left front wheels 7000 via the drive shafts 6000.

A vehicle speed sensor 8002, a position switch 8005 for a shift lever 8004, an accelerator pedal operation amount sensor 8007 for an accelerator pedal 8006, a stop lamp switch 8009 provided for a brake pedal 8008, and an oil temperature sensor 8010 are connected to the ECU 8000 through a harness or the like.

The vehicle speed sensor 8002 detects a vehicle speed based on a rotational speed of the drive shaft 6000, and transmits a signal indicating a detection result of the rotational speeds to the ECU 8000. A position of the shift lever 8004 is detected by the position switch 8005, and a signal indicating a detection result of the position is transmitted to the ECU 8000. According to the position of the shift lever 8004, a shift speed of the transmission 2000 is automatically achieved. The configuration may be such that a driver can select a manual shift mode in which the driver can select an arbitrary shift speed according to an operation performed by the driver.

The accelerator pedal operation amount sensor 8007 detects an operation amount of the accelerator pedal 8006, and transmits a signal indicating a detection result of the operation amount to the ECU 8000. The stop lamp switch 8009 detects an ON/OFF state of the brake pedal 8008, and transmits a signal indicating a detection result of the ON/OFF state to the ECU 8000. Instead of the stop lamp switch 8009, a stroke sensor which detects a stroke amount of the brake pedal 8008 may be provided. The oil temperature sensor 8010 detects a temperature of ATF (Automatic Transmission Fluid) of the transmission 2000, and transmits a signal indicating a detection result of the temperature to the ECU 8000.

The ECU 8000 controls devices so as to achieve a desired vehicle running state based on the signals transmitted from the vehicle speed sensor 8002, the position switch 8005, the accelerator pedal operation amount sensor 8007, the stop lamp switch 8009, the oil temperature sensor 8010, and the like, and maps and programs stored in ROM (Read Only Memory).

Figure 2:
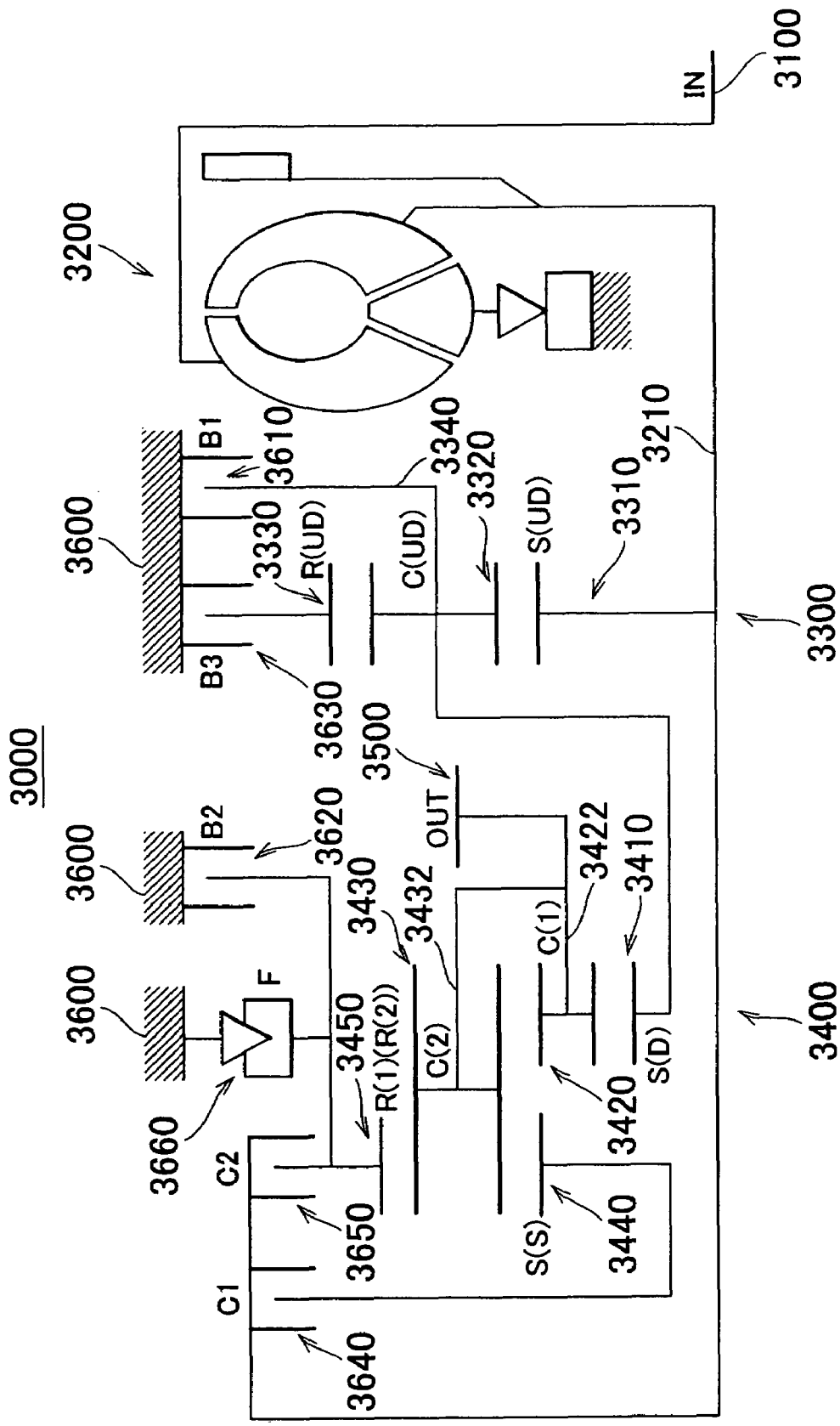
FIG. 2 is a skeleton diagram showing a planetary gear unit.

The planetary gear unit 3000 will be described with reference to FIG. 2. The planetary gear unit 3000 is connected to a torque converter 3200 having an input shaft 3100 coupled with the crankshaft. The planetary gear unit 3000 includes a planetary gear first set 3300; a planetary gear second set 3400; an output gear 3500; a B1 brake 3610, a B2 brake 3620 and a B3 brake 3620 which are fixed to a gear case 3600; a C1 clutch 3640 and a C2 clutch 3650; and a one-way clutch F3660.

The first set 3300 is a planetary gear set of a single pinion type. The first set 3300 includes a sun gear S (UD) 3310, pinions 3320, a ring gear R (UD) 3330, and a carrier C (UD) 3340.

The sun gear S (UD) 3310 is coupled with an output shaft 3210 of the torque converter 3200. The pinions 3320 are rotatably supported by the carrier C (UD) 3340. The pinions 3320 are meshed with the sun gear S (UD) 3310 and the ring gear R (UD) 3330.

The ring gear R (UD) 3330 is fixed to the gear case 3600 by the B3 brake 3630. The carrier C (UD) 3340 is fixed to the gear case 3600 by the B1 brake 3610.

The second set 3400 is a planetary gear set of a Ravigneaux type. The second set 3400 includes a sun gear S (D) 3410, short pinions 3420, a carrier C (1) 3422, long pinions 3430, a carrier C (2) 3432, a sun gear S (S) 3440, and a ring gear R (1) (R (2)) 3450.

The sun gear S (D) 3410 is coupled with the carrier C (UD) 3340. The short pinions 3420 are rotatably supported by the carrier C (1) 3422. The short pinions 3420 are meshed with the sun gear S (D) 3410 and the long pinions 3430. The carrier C (1) 3422 is coupled with the output gear 3500.

The long pinions 3430 are rotatably supported by the carrier C (2) 3432. The long pinions 3430 are meshed with the short pinions 3420, the sun gear S (S) 3440, and the ring gear R (1) (R (2)) 3450. The carrier C (2) 3432 is coupled with the output gear 3500 along with the carrier C (1) (3422).

The sun gear S (S) 3440 is coupled with the output shaft 3210 of the torque converter 3200 by the C1 clutch 3640. The ring gear R (1) (R (2)) 3450 is fixed to the gear case 3600 by the B2 brake 3620, and is coupled with the output shaft 3210 of the torque converter 3200 by the C2 clutch 3650. The ring gear R (1) (R (2)) 3450 is coupled with the one-way clutch F3660, and the ring gear R (1) (R (2)) 3450 is prevented from rotating by the gear case 3600 via the one-way clutch F3660 when the vehicle is driven at first speed.

FIG. 3 is an operation chart showing a relationship between shift speeds and operation states of brakes and clutches. In FIG. 3, a circle indicates an engaged/applied state, and an X indicates a disengaged/released state. A double circle indicates an engaged/applied state which is realized only when an engine brake is applied. A triangle indicates an engaged/applied state which is realized only when the engine drives the transmission. By operating the brakes and the clutches according to the combinations shown in the operation chart, six forward speeds, that are, first speed to six speed, and one reverse speed are achieved.

The one-way clutch F3660 is provided in parallel with the B2 brake 3620. Therefore, as shown by a double circle in the operation chart, the B2 brake 3620 need not be applied when the engine drives the transmission (during acceleration) while first speed (1st) is achieved. In the embodiment, the one-way clutch F3660 prevents the ring gear R (1) (R (2)) from rotating when the vehicle is driven at first speed. When the engine brake is applied, the one-way clutch F3660 does not prevent the ring gear R (1) (R (2)) 3450 from rotating.

Figure 4:
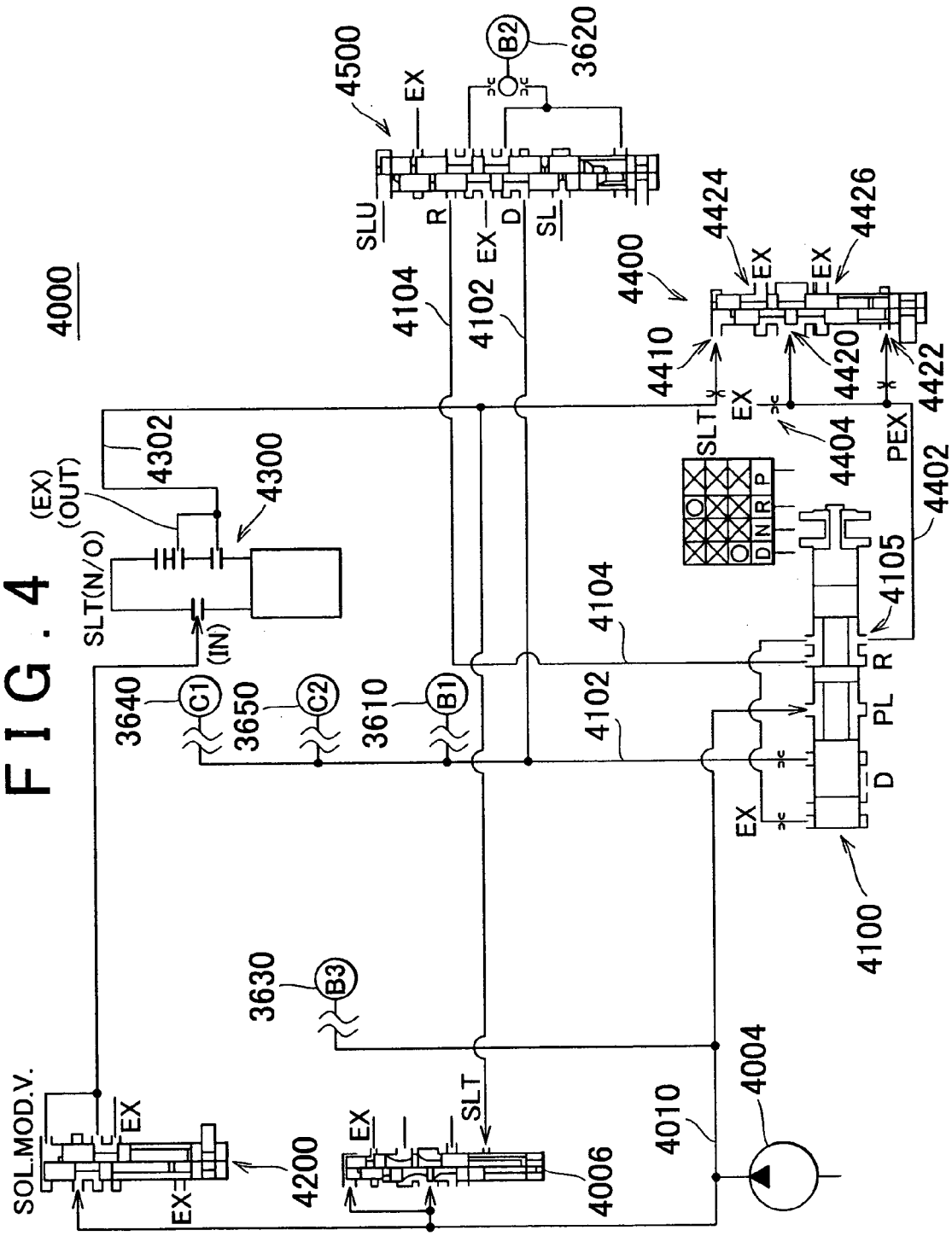
FIG. 4 is a diagram showing part of a hydraulic circuit in the first embodiment of the invention.

The hydraulic circuit 4000 will be described with reference to FIG. 4. FIG. 4 shows only part of the hydraulic circuit 4000, which is related to the invention. The hydraulic circuit 4000 includes an oil pump 4004; a primary regulator valve 4006; a manual valve 4100; a solenoid modulator valve 4200; an SLT solenoid valve (hereinafter, referred to as an "SLT") 4300; an exhaust valve 4400; and a B2 control valve 4500.

The oil pump 4004 is coupled with the crankshaft of the engine 1000. Due to rotation of the crankshaft, the oil pump 4004 is driven, and then hydraulic pressure is generated. The hydraulic pressure generated by the oil pump 4004 is adjusted by the primary regulator valve 4006, and line pressure is generated. The primary regulator valve 4006 operates using the throttle pressure adjusted by the SLT 4300 as pilot pressure.

The line pressure is supplied to the manual valve 4100 through a line pressure oil passage 4010. Also, the line pressure is adjusted by a solenoid valve (not shown), and supplied to the B3 brake 3630.

The manual valve 4100 has a drain port 4105. The hydraulic pressure of a D range pressure oil passage 4102 and the hydraulic pressure of an R range pressure oil passage 4104 are drained from the drain port 4105. When a spool of the manual valve 4100 is at the D position, communication between the line pressure oil passage 4010 and the D range pressure oil passage 4102 is permitted, and hydraulic pressure is supplied to the D range pressure oil passage 4102. At this time, communication between the R range pressure oil passage 4104 and the drain port 4105 is permitted, and the R range pressure of the R range pressure oil passage 4104 is drained from the drain port 4105.

When the spool of the manual valve 4100 is at the R position, communication between the line pressure oil passage 4010 and the R range pressure oil passage 4104 is permitted, and hydraulic pressure is supplied to the R range pressure oil passage 4104. At this time, communication between the D range pressure oil passage 4102 and the drain port 4105 is permitted, and the D range pressure of the D range pressure oil passage 4102 is drained from the drain port 4105.

When the spool of the manual valve 4100 is at the N position, communication between the D range pressure oil passage 4102 and the drain port 4105 and communication between the R range pressure oil passage 4104 and the drain port 4105 are permitted, and the D range pressure of the D range pressure oil passage 4102 and the R range pressure of the R range pressure oil passage 4104 are drained from the drain port 4105.

The hydraulic pressure supplied to the D range pressure oil passage 4102 is finally supplied to the B1 brake 3610, the B2 brake 3620, the C1 clutch 3640 and the C2 clutch 3650. The hydraulic pressure supplied to the R range pressure oil passage 4104 is finally supplied to the B2 brake 3620.

The solenoid modulator valve 4200 adjusts the line pressure to a constant pressure. The hydraulic pressure adjusted by the solenoid modulator valve 4200 (solenoid modulator pressure) is supplied to the SLT 4300.

The SLT 4300 adjusts the solenoid modulator pressure according to a control signal from the ECU 8000, which is based on an accelerator pedal operation amount detected by the accelerator pedal operation amount sensor 8007, and generates throttle pressure. The throttle pressure is supplied to the primary regulator valve 4006 and the exhaust valve 4400 through an SLT oil passage 4302. The throttle pressure is used as the pilot pressure of the primary regulator valve 4006 and the exhaust valve 4400.

When the select operation for changing the position from the D position to the N position or from the R position to the N position is performed, and when the garage shift is performed, the SLT 4300 controls the throttle pressure according to a control signal from the ECU 8000, which is based on an accelerator pedal operation amount and a change speed of the acceleration pedal operation speed that are detected by the acceleration pedal operation amount sensor 8007, a state of the brake pedal 8008 which is detected by the stop lamp sensor 8009, an oil temperature of the ATF which is detected by the oil temperature sensor 8010, and the like.

The exhaust valve 4400 is connected to the manual valve 4100 through a drain oil passage 4402. The exhaust valve 4400 has an SLT port 4410, a first port 4420, a second port 4422, a first drain port 4424 and a second drain port 4426.

The SLT port 4410 is connected to the SLT 4300 through the SLT oil passage 4302. The drain oil passage 4402 is connected to the first port 4420 and the second port 4422.

The throttle pressure supplied to the SLT port 4410 generates a force for moving a spool of the exhaust valve 4400 downward in FIG. 4. The drain pressure supplied to the second port 4422 and an urging force of a spring generate a force for moving the spool of the exhaust valve 4400 upward in FIG. 4.

The drain pressure of the drain oil passage 4402 is divided into the drain pressure which is drained through an orifice 4404 and the drain pressure which is drained through the first drain port 4424 and the second drain port 4426 of the exhaust valve 4400.

When the spool of the exhaust valve 4400 is in the state on the left side in FIG. 4, the drain pressure is drained through the orifice 4404, and the first drain port 4424 and the second drain port 4426 of the exhaust valve 4400.

As the state of the spool of the exhaust valve 4400 comes close to the state on the right side from the state on the left side in FIG. 4, the amount of drain pressure drained from the second drain port 4426 decreases.

When the state of the spool of the exhaust valve 4400 becomes the state on the right side in FIG. 4, the drain pressure is drained only through the orifice 4404, and the drain pressure is not drained from the first drain port 4424 and the second drain port 4426 of the exhaust valve 4400.

The drain pressure of the drain oil passage 4402 is drained through the orifice 4404 regardless of the state of the exhaust valve 4400. Thus, for example, even when an electric failure has occurred and the exhaust valve 4400 is fixed in the state on the right side in FIG. 4, the drain pressure can be reliably drained through the orifice 4404.

When the SLT 4300 decreases the hydraulic pressure (throttle pressure) supplied to the SLT port 4410 of the exhaust valve 4400 according to a control signal from the ECU 8000, the decreasing rate of the drain pressure can be made low.

In the case where the spool of the exhaust valve 4400 is in the state on the left side in FIG. 4, if the throttle pressure is decreased, the spool of the exhaust valve 4400 moves upward in FIG. 4, and an amount of drain pressure drained from the second drain port 4426 decreases. Thus, the decreasing rate of the drain pressure can be adjusted by the throttle pressure.

In the embodiment, the exhaust valve 4400 is configured as a relief valve which controls the spool using primary pressure of the drain pressure. However, the exhaust valve 4400 may be configured as a pressure reducing valve which controls the spool using secondary pressure of the drain pressure.

The B2 control valve 4500 selectively supplies the hydraulic pressure from one of the D range pressure oil passage 4102 and the R range pressure oil passage 4104 to the B2 brake 3620. The D range pressure oil passage 4102 and the R range pressure oil passage 4104 are connected to the B2 control valve 4500. The B2 control valve 4500 is controlled by the hydraulic pressure supplied from an SL solenoid valve (not shown) and an SLU solenoid valve (not shown) and the urging force of the spring.

When the SL solenoid valve is OFF and the SLU solenoid valve is ON, the B2 control valve 4500 is in the state on the left side in FIG. 4. In this case, the B2 brake 3620 is supplied with the hydraulic pressure which is obtained by adjusting the D range pressure, using the hydraulic pressure supplied from the SLU solenoid valve as the pilot pressure.

When the SL solenoid valve is ON and the SLU solenoid valve is OFF, the B2 control valve 4500 is in the state on the right side in FIG. 4. In this case, the R range pressure is supplied to the B2 brake 3620.

The thus configured hydraulic control apparatus for an automatic transmission according to the embodiment have the following features.

Hereafter, a description will be made concerning the case where the select operation for changing the position from the D position to the N position or from the R position to the N position is performed. When the driver operates the shift lever 8004, and performs the select operation for changing the position from the D position to the N position or from the R position to the N position, the spool of the manual valve 4100 is moved from the D position to the N position or from the R position to the N position. Therefore, the D range pressure oil passage 4102 and the R range pressure oil passage 4104 are communicated with the drain port 4105. Accordingly, the D range pressure and the R range pressure are drained from the drain port 4105, and all the clutches or the brakes except the B3 brake 3630 are disengaged/released. The hydraulic pressure supplied to the B3 brake 3630 is drained from a drain port of a solenoid valve (not shown) connected to the B3 brake 3630.

If all the engaged clutches are disengaged and the applied brakes are released at the same time and the torque output from the transmission 2000 is lost suddenly, the select shock might occur.

In order to suppress the select shock, the exhaust valve 4400 adjusts the decreasing rate of the drain pressure. When the state of the spool of the exhaust valve 4400 becomes the state on the right side in FIG. 4, the drain pressure is not drained from the first drain port 4424 and the second drain port 4426, and the drain pressure is drained from the drain oil passage 4402 through only the orifice 4404. Therefore, the decreasing rate of the drain pressure of the drain oil passage 4402 can be low, and the D range pressure and the R range pressure can be decreased gradually. Therefore, the clutch can be disengaged or the brake can be released gradually, and the select shock can be suppressed.

Hereafter, a description will be made concerning the operation when the oil temperature is low. In the case where the oil temperature is low, if the drain pressure is decreased gradually, it takes long to drain the drain pressure, which causes the possibility that the clutch or the brake has a low torque capacity. In order to suppress occurrence of the state where the clutch or the brake has a low torque capacity, the ECU 8000 controls the SLT 4300 such that the hydraulic pressure supplied from the SLT 4300 to the SLT port 4410 of the exhaust valve 4400 is high in the case where the oil temperature is low, as compared to the case where the oil temperature is high. Thus, the amount of drain pressure drained from the first drain port 4424 and the second drain port 4426 is increased, and the decreasing rate of the drain pressure is made high. Therefore, the drain pressure is decreased promptly, and the clutch or the brake can be disengaged/released promptly.

Hereafter, a description will be made concerning the case where the garage shift is performed. When the garage shift is performed, shifting from the D position to the R position or shifting from the R position to the D position needs to be performed promptly. If the engaged clutch or the applied brake is not disengaged/released promptly, tie-up (i.e., double lock-up) may occur. In order to suppress occurrence of tie-up, the decreasing rate of the drain pressure is made high, and the decreasing date of the D range pressure or the R range pressure is made high. In order to make the decreasing rate of the D range pressure or the R range pressure high, the SLT 4300 increases the hydraulic pressure supplied to the SLT port 4410 of the exhaust valve 4400 according to a control signal from the ECU 8000. Thus, the amount of drain pressure drained from the first drain port 4424 and the second drain port 4426 is increased. Therefore, the drain pressure of the drain oil passage 4402 is decreased promptly, and the clutch or the brake is disengaged/released promptly, whereby occurrence of tie-up can be suppressed.

For example, in the case where the accelerator pedal operation amount is large, the hydraulic pressure supplied to from the SLT 4300 to the SLT port 4410 of the exhaust valve 4400 may be made high and the decreasing rate of the drain pressure may be made high, as compared to the case where the accelerator pedal operation amount is small. Also, in order to suppress vehicle running by creeping, in the case where the brake pedal 8008 is not depressed, the hydraulic pressure supplied from the SLT 4300 to the SLT port 4410 of the exhaust valve 4400 may be made high and the decreasing rate of the drain pressure may be made high, as compared to the case where the brake pedal 8008 is depressed.

In the embodiment, the hydraulic pressure supplied from the SLT 4300 is used as the pilot pressure of the exhaust valve 4400. However, a dedicated solenoid valve for controlling the exhaust valve 4400 may be provided instead of the SLT 4300.

As mentioned above, the hydraulic control apparatus for an automatic transmission according to the embodiment includes the manual valve having a drain port; a drain oil passage which is connected to the drain port of the manual valve; and the exhaust valve which is connected to the drain oil passage and which performs control so as to change the decreasing rate of the drain pressure. Thus, when the select operation for changing the position from the D position to the N position or from the R position to the N position is performed, the drain pressure can be decreased gradually, and the select shock can be suppressed. Also, when the oil temperature is low, the drain pressure can be decreased promptly, and occurrence of tie-up can be suppressed. Since the exhaust valve is connected to the drain oil passage, the exhaust valve does not become the resistance of the D range pressure oil passage and the R range pressure oil passage. Therefore, the exhaust valve does not produce adverse effect when the hydraulic pressure supplied to the clutch or the brake is adjusted.

A second embodiment of the invention will be described with reference to FIG. 5. In the first embodiment, a spool valve is employed as the exhaust valve. However, in the second embodiment, a poppet valve may be employed as the exhaust valve. In the first embodiment, the exhaust valve is controlled using the hydraulic pressure which is obtained by adjusting the solenoid modulator pressure by the SLT. However, in the second embodiment, the exhaust valve is controlled using the engagement pressure which is obtained by adjusting the line pressure by the solenoid valve. The other structure is the same as that in the first embodiment. The functions of the other structure are also the same as those in the first embodiment. Therefore, the detailed description of the other structure is not made here.

Figure 5:
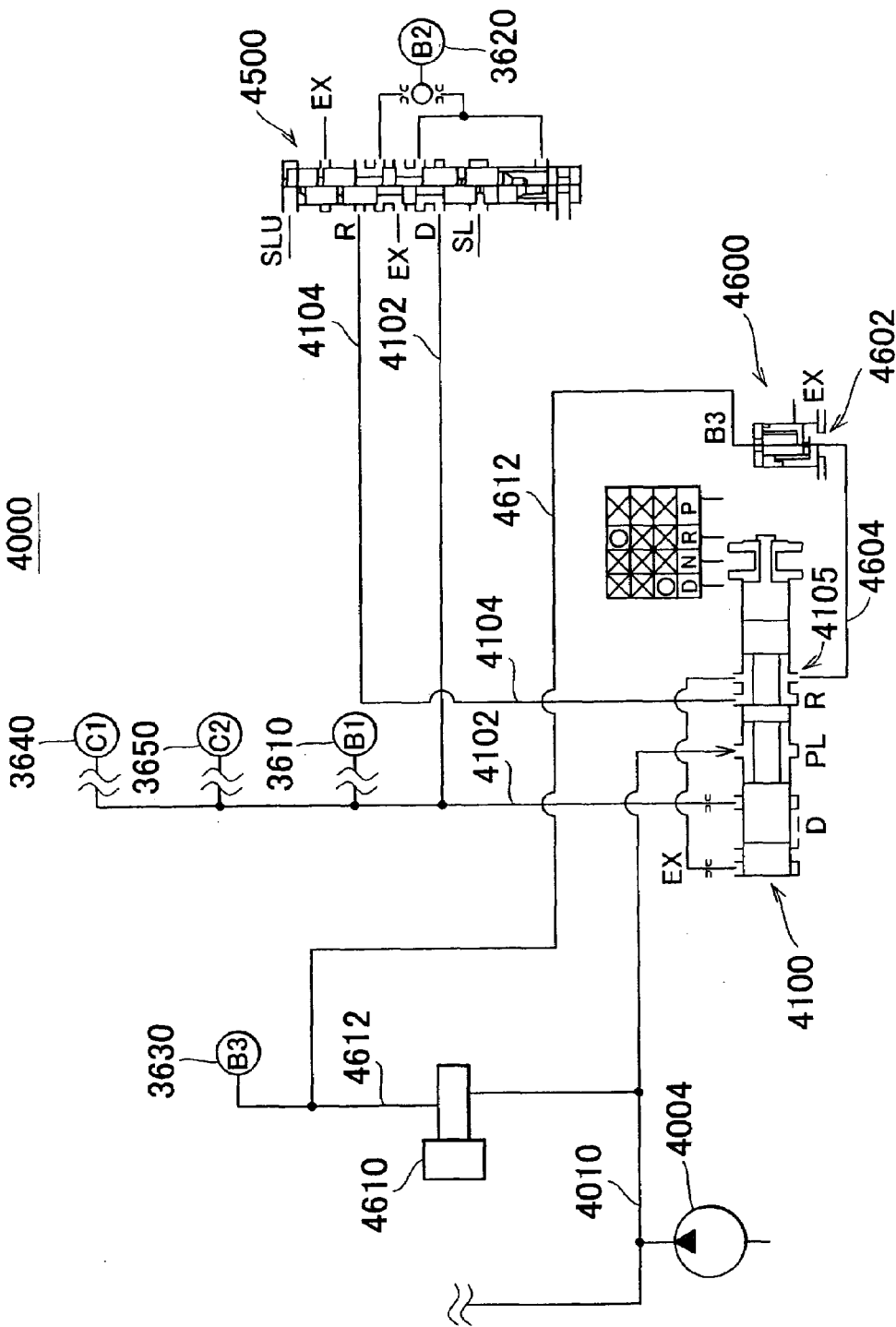
FIG. 5 is a diagram showing part of a hydraulic circuit in a second embodiment of the invention.

As shown in FIG. 5, the hydraulic circuit 4000 includes an exhaust valve 4600 and a solenoid valve 4610. The exhaust valve 4600 is a poppet valve. A drain oil passage 4604 is connected to a port 4602 of the exhaust valve 4600 and the drain port 4105 of the manual valve 4100. The drain pressure of the drain oil passage 4604 is drained from the exhaust valve 4600.

The solenoid valve 4610 is connected to the line pressure oil passage 4010. The engagement pressure which is adjusted by the solenoid valve 4610 is supplied to the B3 brake 3630 and the exhaust valve 4600 through a B3 oil passage 4612.

The exhaust valve 4600 operates using the hydraulic pressure supplied from the solenoid valve 4610. When the clutch is disengaged or the brake is released gradually, the hydraulic pressure supplied from the solenoid valve 4610 to the exhaust valve 4600 is decreased gradually, and the decreasing rate of the drain pressure of the drain oil passage 4604 is made low.

When the clutch is disengaged or the brake is released promptly, the hydraulic pressure supplied from the solenoid valve 4610 to the exhaust valve 4600 is decreased promptly, and the decreasing rate of the drain pressure of the drain oil passage 4604 is made high. When such a configuration is employed, the same effects as those in the first embodiment can be obtained.

A third embodiment of the invention will be described with reference to FIG. 6. In the first embodiment, a spool valve is employed as the exhaust valve. However, in the third embodiment, an orifice change-over valve is employed as the exhaust valve. The other structure is the same as that in the first embodiment. The functions of the other structure are also the same as those in the first embodiment. Therefore, the detailed description of the other structure is not made here.

Figure 6:
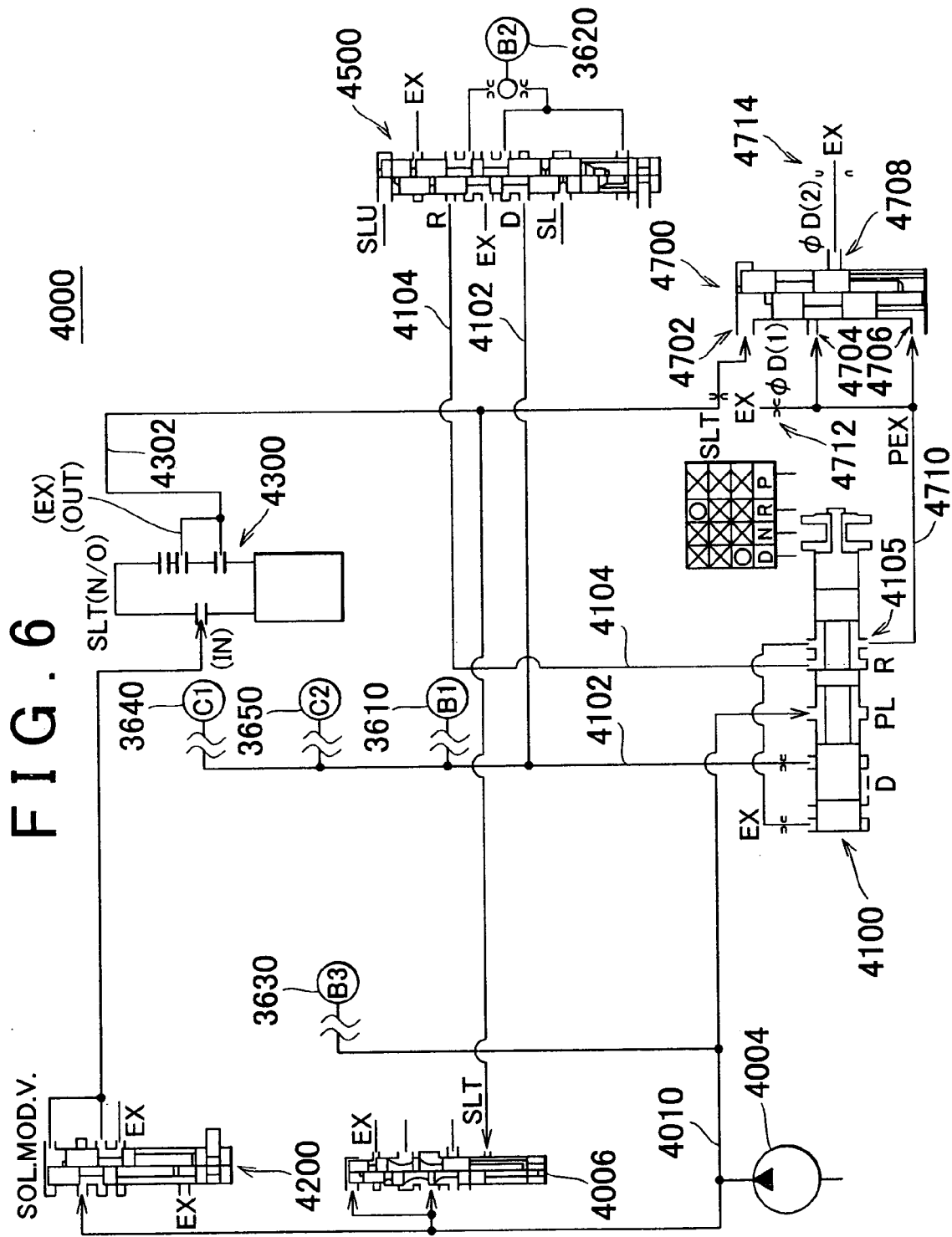
FIG. 6 is a diagram showing part of a hydraulic circuit in a third embodiment of the invention.

As shown in FIG. 6, the hydraulic circuit 4000 includes an exhaust valve 4700. The exhaust valve 4700 is an orifice change-over valve. The exhaust valve 4700 includes an SLT port 4702; a first port 4704; a second port 4706; and a drain port 4708.

The SLT port 4702 is connected to the SLT oil passage 4302. The hydraulic pressure adjusted by the SLT 4300 is supplied to the SLT port 4702. A drain oil passage 4710 is connected to the first port 4704, the second port 4706 and the drain port 4105 of the manual valve 4100. The spool of the exhaust valve 4700 operates using the hydraulic pressure supplied to the SLT port 4702, the hydraulic pressure supplied to the second port 4706, and the urging force of the spring.

The drain pressure of the drain oil passage 4710 is divided into the drain pressure drained through a small orifice 4712, and the drain pressure drained through the drain port 4708 and a large orifice 4714. The diameter D (1) of the small orifice 4712 is smaller than the diameter D (2) of the large orifice 4714.

When the clutch is disengaged or the brake is released gradually, the throttle pressure supplied from the SLT 4300 to the exhaust valve 4700 is decreased, and the state of the exhaust valve 4700 is changed to the state on the right side in FIG. 6. Thus, the drain pressure is drained gradually through the small orifice 4712. Accordingly, the D range pressure or the R range pressure is decreased gradually, and the clutch is disengaged or the brake is released gradually.

When the clutch is disengaged or the brake is released promptly, the hydraulic pressure supplied from the SLT 4300 is increased, and the state of the exhaust valve 4700 is changed to the state on the left side in FIG. 6. Thus, the drain pressure is drained promptly through both the small orifice 4712 and the large orifice 4714. Therefore, the D range pressure or the R range pressure is decreased promptly, and the clutch is disengaged or the brake is released promptly. When such a configuration is employed, the same effects as those in the first embodiment can be obtained.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less ore only a single element, are also within the spirit and scope of the invention.

What is claimed is:

1. A hydraulic control apparatus for an automatic transmission provided with a friction engaging element that operates using hydraulic pressure, comprising:

a range pressure oil passage which is connected to the friction engaging element;

a manual valve which is connected to the range pressure oil passage;

a drain port which is formed in the manual valve and which drains hydraulic pressure of the range pressure oil passage;

a drain oil passage which is connected to the drain port; and a drain pressure controller which is connected to the drain oil passage and which performs control so as to variably change a decreasing rate of drain pressure of the drain oil passage.

2. The hydraulic control apparatus for an automatic transmission according to claim 1, further comprising:
an oil pump which generates hydraulic pressure;
a line pressure oil passage which is connected to the oil pump;
a pilot pressure generator which is connected to the line pressure oil passage, and
which generates pilot pressure by adjusting line pressure of the line pressure oil passage; and
a pilot pressure oil passage which is connected to the drain pressure controller and the pilot pressure generator, wherein
the drain pressure controller operates so as to change the decreasing rate of the drain pressure of the drain oil passage based on the pilot pressure.

3. The hydraulic control apparatus for an automatic transmission according to claim 2, wherein
the pilot pressure generator is a valve which generates pilot pressure for adjusting the line pressure based on an operation amount of an accelerator pedal.

4. The hydraulic control apparatus for an automatic transmission according to claim 2, wherein
the pilot pressure generator is connected to the friction engaging element which is operated by engagement pressure that is adjusted using the line pressure of the line pressure oil passage as original pressure.

5. The hydraulic control apparatus for an automatic transmission according to claim 2, wherein
the drain pressure controller changes the decreasing rate of the drain pressure by moving a spool, draining oil in the drain oil passage and adjusting a decrease in hydraulic pressure based on the pilot pressure.

6. The hydraulic control apparatus for an automatic transmission according to claim 2, wherein
the drain pressure controller is a poppet valve, and changes the decreasing rate of the drain pressure by draining oil in the drain oil passage and adjusting a decrease in hydraulic pressure based on the pilot pressure.

7. The hydraulic control apparatus for an automatic transmission according to claim 2, wherein
the drain pressure controller is an orifice change-over valve, and changes the decreasing rate of the drain pressure by draining oil in the drain oil passage through an orifice and adjusting a decrease in hydraulic pressure based on the pilot pressure.

8. The hydraulic control apparatus for an automatic transmission according to claim 1, wherein,
the decreasing rate of the drain pressure when an oil temperature of the automatic transmission is low is made higher than the decreasing rate of the drain pressure when the oil temperature of the automatic transmission is high.

9. The hydraulic control apparatus for an automatic transmission according to claim 1, wherein
the decreasing rate of the drain pressure when a garage shift is performed is made higher than the decreasing rate of the drain pressure when a shift from a drive position to a neutral position or a shift from a reverse position to the neutral position is performed normally, in a case where shifting of the automatic transmission is performed.

* * * * *